United States Patent [19]

Goto

[11] Patent Number: 5,245,469
[45] Date of Patent: Sep. 14, 1993

[54] REAL IMAGE TYPE FINDER OPTICAL SYSTEM

[75] Inventor: Hisashi Goto, Musashino, Japan

[73] Assignee: Olympus Optical Co., Ltd., Tokyo, Japan

[21] Appl. No.: 865,476

[22] Filed: Apr. 9, 1992

[30] Foreign Application Priority Data

Apr. 10, 1991 [JP] Japan .................................. 3-077801

[51] Int. Cl.⁵ .......................... G02B 23/00; G02B 5/04; G03B 13/02
[52] U.S. Cl. .................................. 359/362; 359/432; 359/837; 354/219
[58] Field of Search .............................. 359/591-599, 359/443-461, 615, 629, 707, 721, 362-363, 422, 423, 432-435, 577-583, 642, 724, 725, 619, 837; 354/162-166, 199, 200, 219, 221-223

[56] References Cited

U.S. PATENT DOCUMENTS

| | | | |
|---|---|---|---|
| 3,003,387 | 10/1961 | Schiele | 359/454 |
| 3,718,078 | 2/1973 | Plummer | 359/459 |
| 4,302,089 | 11/1981 | Fukuhara | 359/629 |
| 4,427,265 | 1/1984 | Suzuki et al. | 359/599 |
| 4,519,686 | 5/1985 | Seki et al. | 359/454 |
| 4,591,256 | 5/1986 | Matsumura | 359/629 |
| 4,775,229 | 10/1988 | Ichihara et al. | 359/721 |

FOREIGN PATENT DOCUMENTS 59-189329 10/1984 Japan .

Primary Examiner—Bruce Y. Arnold
Assistant Examiner—Thong Nguyen
Attorney, Agent, or Firm—Cushman, Darby & Cushman

[57] ABSTRACT

A real image type finder optical system comprising, in order from the object side, an objective lens, a reticle, a condenser lens and an eyepiece lens. The reticle has a surface of incidence which is located in the vicinity of a plane on which a primary image is to be formed by the objective lens and is configured so as to diffuse a light bundle in different directions by central portion and marginal portion thereof. This finder optical system is capable of forming a sharp image with distortion favorably corrected, has high accuracy for detecting a focused condition and can be composed compactly.

8 Claims, 6 Drawing Sheets

GRIN

REAL IMAGE TYPE FINDER OPTICAL SYSTEM

BACKGROUND OF THE INVENTION a) Field of the Invention

The present invention relates to a finder optical system, and more specifically to a real image type finder optical system for single-lens reflex cameras.

b) Description of the Prior Art

Figure 1:
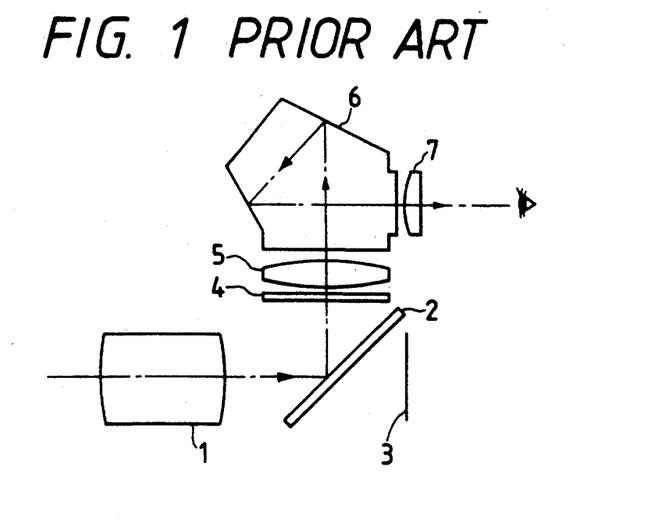
FIG. 1 is a sectional view illustrating an overall configuration of the conventional finder optical system.

Out of finder optical systems used in cameras and so on, a real image type finder optical system, which allows a photographer himself to confirm whether or not the optical system is in good focus, generally consists of an objective lens, a reticle having a diffusing surface and a focal plane, a condenser lens disposed in the vicinity of the reticle and an eyepiece lens. An example of configuration of a real image type finder optical system for singlelens reflex cameras is illustrated in FIG. 1, wherein the reference numeral 1 represents a photographic lens used as an objective lens of the finder optical system, the reference numeral 2 designates a quick return mirror which is removed from an optical path of the photographic lens 1 for allowing a light bundle to reach a film surface 3 for photographing, the reference numeral 4 denotes a reticle which has a focal plane having a light diffusing function and a Fresnel surface for converging the light bundle, the reference numeral 5 represents a condenser lens, the reference numeral 6 designates a pentagonal prism, and the reference numeral 7 denotes an eyepiece lens. In this finder optical system, a light bundle which is emitted from an object to be photographed and incident on the photographic lens 1 emerges from the photographic lens 1, and then is reflected by the quick return mirror 2 and imaged on the focal plane of the reticle 4. Further, the light bundle is converged by the condenser mirror 5, and the image formed on the focal plane of the reticle 4 is inverted by the pentagonal prism 6 is both the vertical and horizontal directions into an erect image, and reimaged by the eyepiece lens 7 onto a retina of an eye of a photographer.

Figure 2:
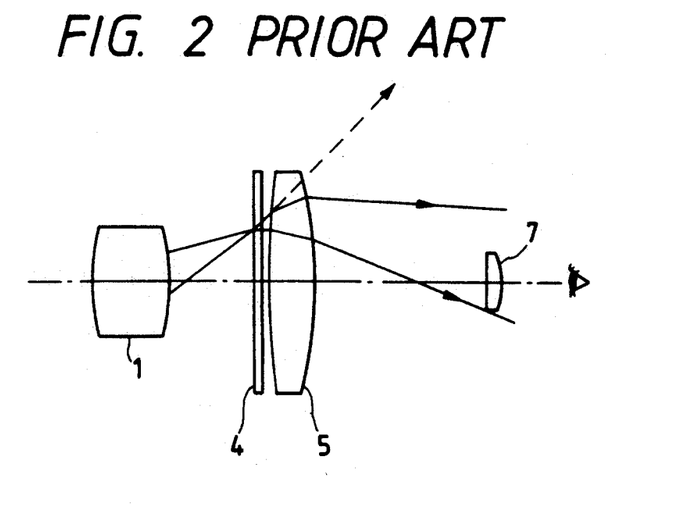
FIG. 2 is a sectional view illustrating a diffusing characteristic of a reticle used in the conventional finder optical system.

In the finder optical system described above, the condenser lens 5 has two functions for converging the light bundle and correcting aberrations. First, description will be made of the converging function of the condenser lens 5. In FIG. 2 which illustrates a conceptional diagram of the real image type finder optical system, the light bundle which is emitted from the object to be photographed and transmits through the photographic lens 1 is diverged by the focal plane of the reticle 4 and then refracted as a whole by the condenser lens 5 toward the optical path as indicated by solid lines so that a portion of the light bundle is incident on a pupil of the photographer through the eyepiece lens 7. If the finder optical system does not use the condenser lens 5, on the other hand, the light bundle is diverged by the reticle 4, but light beams emitted from image points which are located at distances longer than a certain definite distance from the optical axis are not incident on the eyepiece lens 7 as indicated by a dashed line in FIG. 2, whereby the photographer cannot observe an image through the finder optical system. The condenser lens 5 has the function for converging the light bundle as described above.

Then, description will be made of the function of the condenser lens 5 for correcting aberrations. In the real image type finder optical system, aberrations such as spherical aberration can be corrected by the eyepiece lens 7 for allowing to observe a sharp image. Even when the aberrations are corrected by the eyepiece lens 7, however, only distortion can hardly be corrected since light beams coming from different image heights are overlapped with one another on the eyepiece lens 7. In order to correct the aberrations such as spherical aberration together with the distortion favorably by the eyepiece lens 7, this lens must inevitably have a very complicated composition, which is undesirable from viewpoints of manufacturing cost, size or form of finder body and so on. In contrast, the distortion can be corrected relatively easily by the condenser lens 5 on which the light beams coming from the different image heights are separated from one another.

Figure 3:
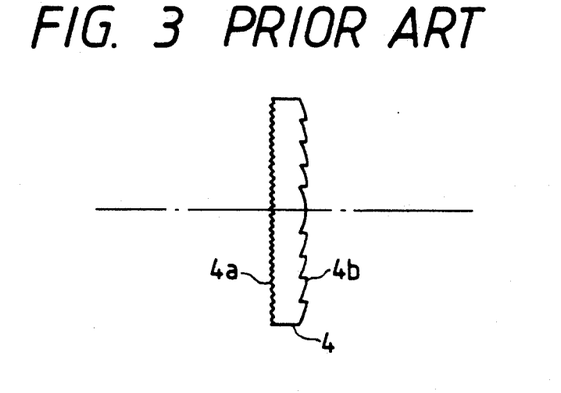
FIG. 3 is a side view illustrating an example of a reticle which has a diffusing surface on one side and a Fresnel surface on the other side for use in the conventional finder optical system.

Out of the two functions of the condenser lens 5 described above, the function for converging a light bundle can be allocated to a Fresnel lens. Speaking concretely, the thickness of the condenser lens 5 which is inevitably produced by imparting curvature to the condenser lens 5 can be reduced by using the Fresnel lens. Actually, there have already been offered for sale finders which adopt the reticle 4 having a diffusing surface 4a on one side and a Fresnel surface on the other side as shown in FIG. 3 for omitting the condenser lens 5, and therefore comprise reduced numbers of optical members and have compacter bodies. On the other hand, there have also been proposed finder optical systems in which curvature required only for correction of the aberrations is imparted to the lenses and the refractive power required for converging a light bundle is imparted to Fresnel lenses.

Further, there have already been disclosed reticles which have diffusing surfaces functioning to diffuse rays in directions varying from central portions toward marginal portions thereof for enlarging apertures of finder optical systems as exemplified by Japanese Patent Preliminary Publication No. Sho 59-189329.

In the case of the conventional finder optical system wherein only the condenser lens 5 is used without adopting the Fresnel lens, it is impossible to make finder body compact though the distortion can be corrected. In the case of the conventional finder optical system wherein the condenser lens 5 is used in combination with the Fresnel lens, thickness of the condenser lens 5 can be reduced to a certain degree, but it is impossible to effectively make the finder body compact since the finder body must contain a space for accommodating these two optical members. Further, in the case of the conventional finder optical system wherein the reticle 4 has a diffusing surface 4a and a Fresnel surface 4b which are formed on the object side and the eyepiece lens side respectively, steps formed on the Fresnel surface are visible when diopter of the photographer's eye is coincident with the steps on the Fresnel surface, thereby hindering observation of the image of the object to be photographed. This phenomenon is apt to occur particularly when the finder optical system is out of focus and forms a remarkably blurred image on the diffusing surface 4a. Furthermore, when the diffusing surface 4a is disposed on the side of the eyepiece lens and the Fresnel surface 4b is disposed on the object side, contrary to the case described above, the diopter of the photographer's eye is rarely coincident with the steps on the Fresnel surface 4b since the Fresnel surface is located on the object side of the diffusing surface 4a, but there is posed another problem that the location of the focal plane is varied dependently on thickness of the reticle. Even if the focal plane of the reticle 4 is attached to a camera body, the optical path is varied due to uniformity in thickness of the reticle 4 or variation of thickness of individual reticles, thereby producing direct influence on detecting accuracy of focused condition of the finder optical system. This influence on the detecting accuracy of the focused condition is extremely apt to be produced particularly in finder optical systems wherein the reticle 4 is exchangeable with another.

SUMMARY OF THE INVENTION

In view of the present circumstances described above, it is a primary object of the present invention to provide real image type finder optical system which is capable of forming a sharp image with favorably corrected distortion, has high detecting accuracy of a focused condition thereof and can be configured compactly.

According to the present invention, this object can be attained by composing the finder optical system, in order from the object side, of an objective lens for forming a primary image, a reticle having a surface of incidence located in the vicinity of a plane on which the primary image is to be formed and a diffusing function for diffusing a central beam and a marginal beam of a transmission light bundle in different directions, a condenser lens disposed in the vicinity of the reticle, and an eyepiece lens for allowing observation of the plane on which the primary image is to be formed.

The finder optical system according to the present invention, in which the reticle has a focal plane on the object side, allows observation of a sharp image through the eyepiece lens and provides enhanced accuracy for detecting the focused condition thereof. Further, the finder optical system according to the present invention, in which the reticle diffuses light beams in directions varying from the central portion toward the marginal portion thereof in conjunction with variation of image height, can provide a sharper image. When the condenser lens has weak positive power, the diffusing surface of the reticle is configured so as to diffuse the light beams in directions varying toward the optical axis from the central portion toward the marginal portion thereof (have a positive converging function) for making up for the weak positive power of the condenser lens with that of the focal plane of the reticle. When the condenser lens has strong positive power, in contrast, it is preferable to configure the diffusing surface of the reticle so as to diffuse the light beams in directions varying away from the optical axis from the central portion toward the marginal portion thereof (have a negative converging function) for weakening the strong positive power of the condenser lens by that of the focal plane of the reticle.

In a preferable formation of the present invention, the refractive power of the condenser lens is selected so that the condenser lens and the reticle have a total power to converge a light bundle. Further, the reticle is made of a light diffusing material which diffuses a light bundle in directions progressively inclined toward the optical axis from a central light beam toward a marginal light beam contained therein.

This and other objects as well as the features and the advantages of the present invention will become apparent from the following detailed description of the preferred embodiments when taken in conjunction with the accompanying drawings.

DESCRIPTION OF THE PREFERRED EMBODIMENTS

Figure 4:
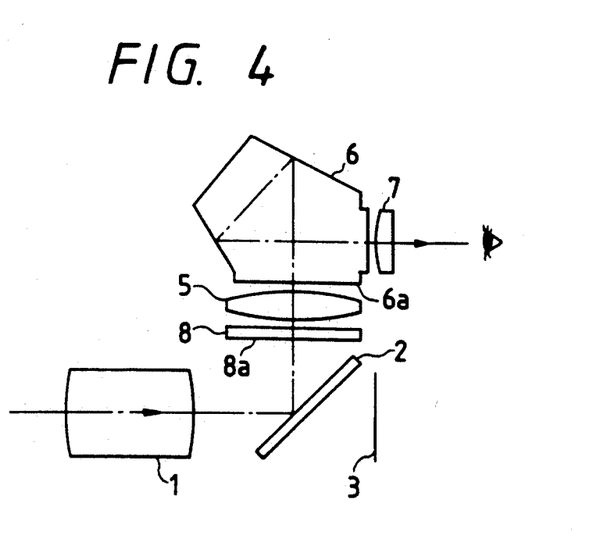
FIG. 4 is a sectional view illustrating an overall configuration of a first embodiment of the real image type finder optical system according to the present invention.
Figure 5:
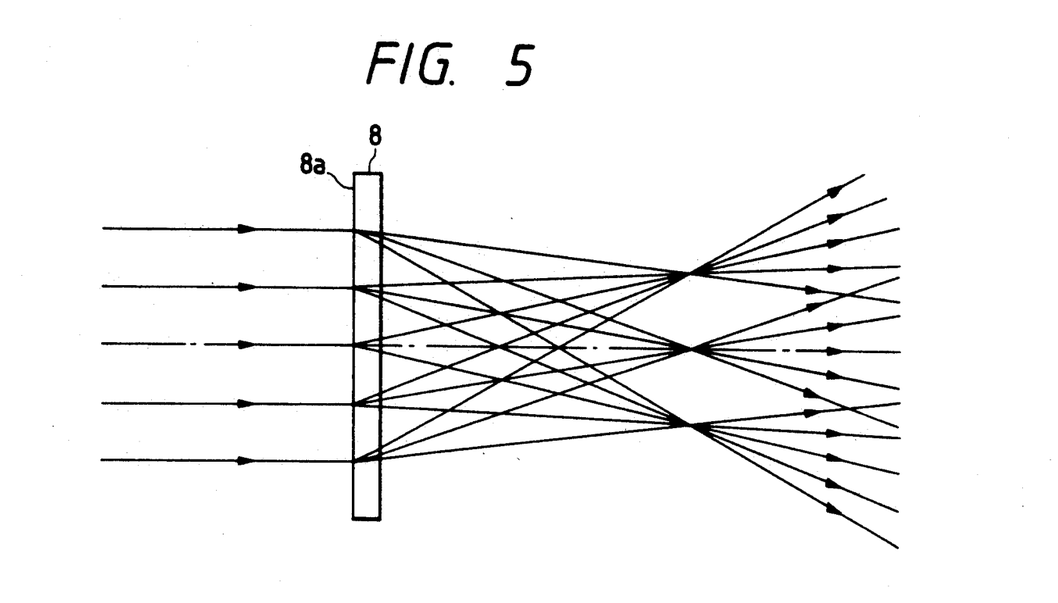
FIG. 5 is a sectional view illustrating a diffusing characteristic of the reticle used in the first embodiment of the present invention for a light bundle incident in parallel with the optical axis of the reticle.
Figure 6:
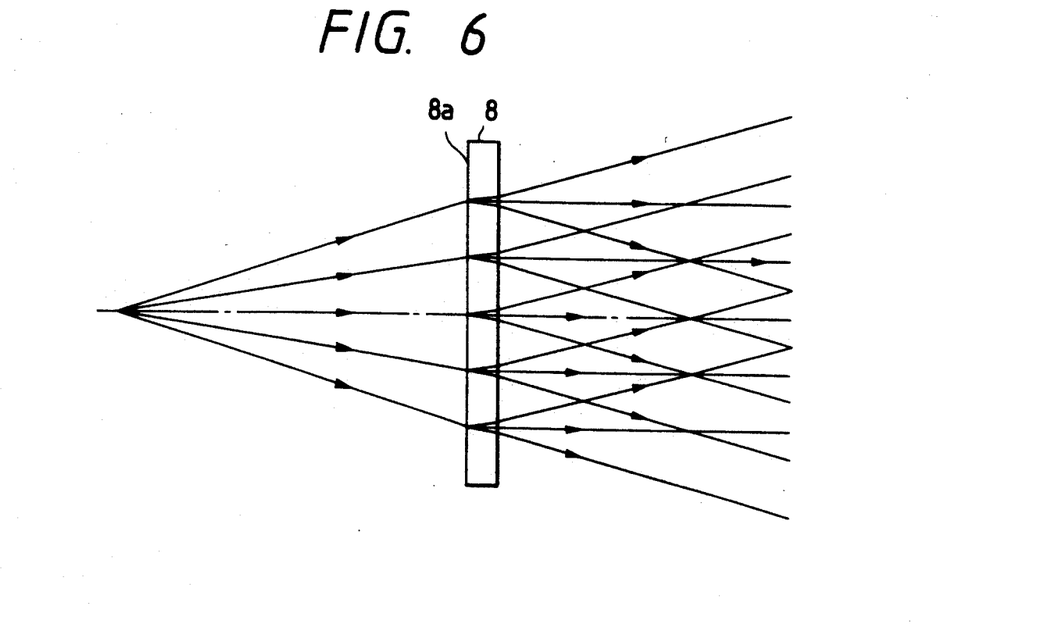
FIG. 6 is a side view illustrating a diffusing characteristic of the reticle used in the first embodiment of the present invention for a light bundle emitted from a point on the optical axis of the reticle.

Now, the first embodiment of the finder optical system according to the present invention will be described below with reference to FIG. 4 through FIG. 8 using reference numerals representing the members of the conventional finder optical system for the members of the finder optical system according to the present invention which are the same as those on the conventional finder optical system. As illustrated in FIG. 4, the finder optical system preferred as the first embodiment of the present invention has a configuration which is substantially the same as that of the conventional example. As shown in FIG. 4, disposed in an optical path on the object side of the condenser lens 5 is a reticle which has a focal plane (a primary image surface) 8a formed as a diffusing surface on the object side. This focal plane 8a is configured so as to diffuse rays in different directions by the central portion and the marginal portion thereof. In other words, a light bundle which is incident on the focal plane 8a is diverged when it is seen within narrow regions and converged when it is seen within an overall region. The focal plane 8a has such a diffusing characteristic that a light bundle incident thereon in parallel with the optical axis is diverged within the narrow regions, diffused progressively toward the optical axis as the portions of the focal plane are farther from the optical axis and converged as a whole as shown in FIG. 5. When a light bundle emitted from a point on the optical axis is incident on the focal plane 8a as shown in FIG. 6, on the other hand, the reticle 8 diffuses the light bundle so that the center direction of the light bundle is in parallel with the optical axis.

In the finder optical system according to the present invention which comprises the reticle having the diffusing characteristics described above, a light bundle which is emitted from an object to be photographed and incident on the photographic lens 1 emerges from the photographic lens 1, and then is reflected by the quick return mirror 2 and imaged on the focal plane 8a of the reticle 8. The light bundle is diverged within the narrow regions and converged as a whole by the focal plane 8a as described above (see FIG. 5). The light bundle is condensed and distortion is corrected by the condenser lens, whereafter the light bundle is incident on the surface of incidence 6a of the pentagonal prism 6 and an image formed on the focal plane 8a of the reticle 8 is inverted in both the vertical and horizontal directions to form an erect image, aberrations such as spherical aberration are corrected by the eyepiece lens 7 and the image is reimaged on the retina of the photographer.

Figure 7:
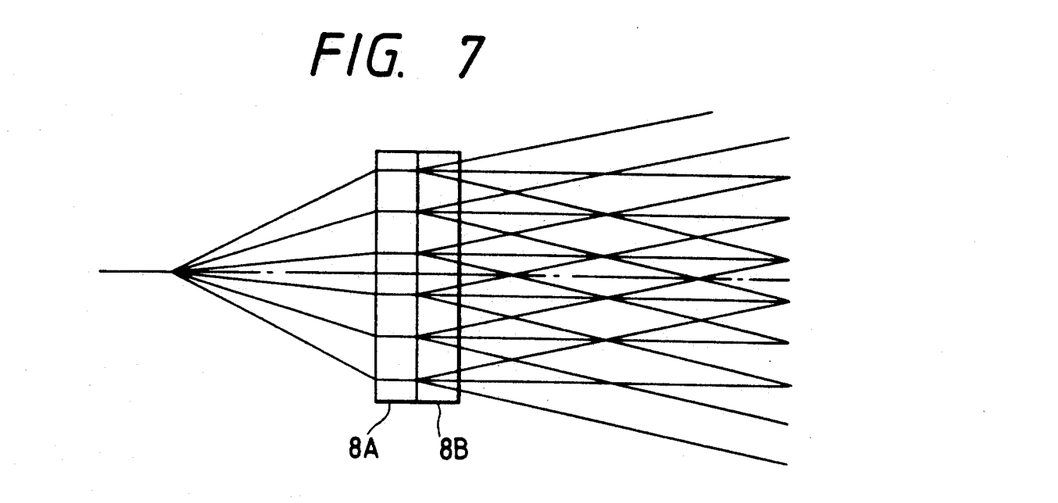
FIG. 7 is a side view illustrating a diffusing characteristic of a reticle using a holographic optical element which is developed for use in the finder optical system according to the present invention.
Figure 8:
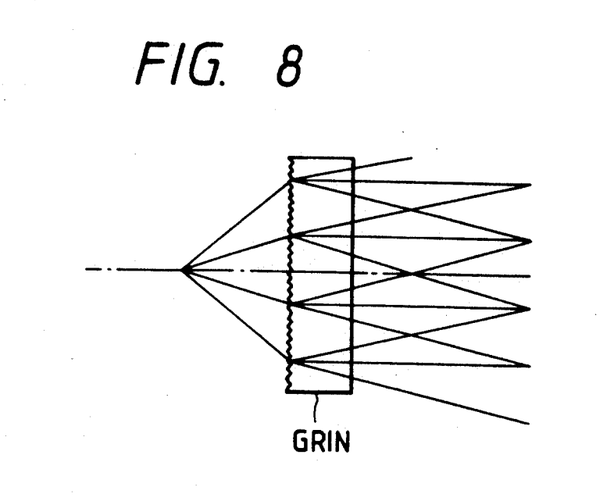
FIG. 8 is a side view illustrating a diffusing characteristic of a reticle using a distributed index of refraction type lens which is developed for use in the finder optical system according to the present invention.

Positional accuracy on the objective lens and the film surface 3a disposed in the finder optical system (in case of a single-lens reflex camera) can be enhanced by arranging the focal plane 8a of the reticle 8 on the side of the photographic lens 1. Further, the finder body can be made compacter and a sharp image of the object can be obtained by designing the focal plane 8a so as to have the converging function. When a light bundle emitted from a point on the optical axis is incident on the focal plane 8a as shown in FIG. 6, a function or effect which is the same as that illustrated in FIG. 6 can be obtained, for example, by combining a diverging function (a function to divide a light bundle into a zero order ray and ±1 order ray) of a holographic optical element 8A having a diffracting function with another holographic optical element 8B having a function of a convex lens as shown in FIG. 7. Further, the effect or function can be obtained by using a distributed index of refraction type lens having refractive power which is progressively strengthened as the portions of the lens are farther from the optical axis in the radial direction.

Figure 9:
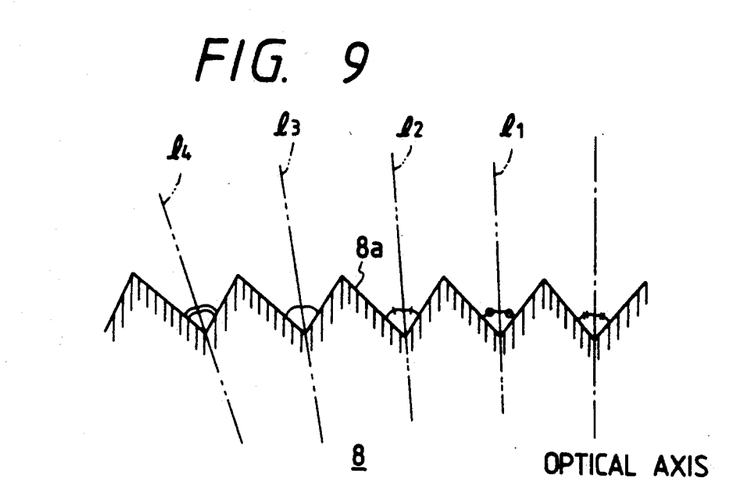
FIG. 9 is a side view illustrating a diffusing characteristic of a reticle composed by using a mat-relief which is developed for use in the first embodiment of the present invention.
Figure 10:
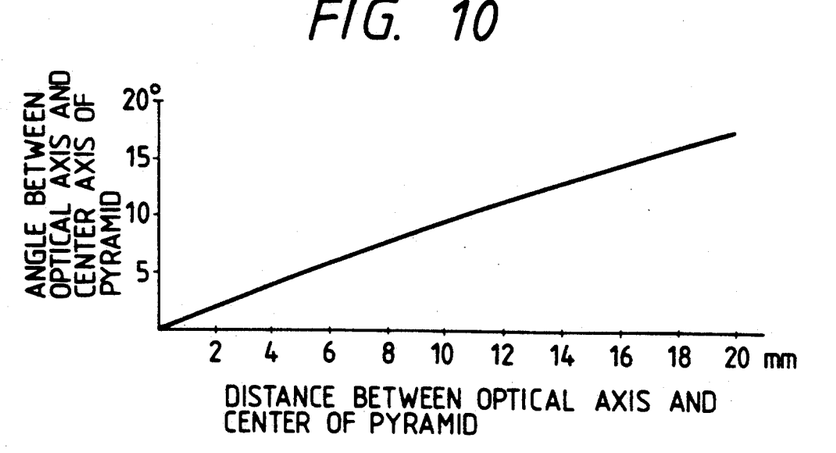
FIG. 10 is a graph illustrating relationship of a distance between the optical axis and center of pyramid versus an angle between the optical axis and center axis of pyramid on the mat-relief developed for the first embodiment of the present invention.

FIG. 9 shows an example of the reticle 8 wherein a mat-relief is used on the reticle 8 and the focal plane 8a is composed of pyramids. In this example, center axes $l_1$, $l_2$, $l_3$ and $l_4$ of the pyramids have inclination angles relative to the optical axis which are larger as the pyramids are farther from the optical axis. FIG. 10 visualizes relationship of distance as measured between the optical axis and the center axis of the pyramid versus the inclination angle of the center axis of the pyramid when a light bundle emitted from a point 121 mm apart from the focal plane 8a of the reticle having the mat-relief is diffused by the focal plane 8a in such a direction that the center of the light bundle is in parallel with the optical axis. Even when the mat-relief is used on the reticle 8 as described above, positional accuracy on the objective lens and the film surface can be enhanced and the finder body can be made compacter by setting the center axes of the pyramids as described above. Though the mat-relief is shaped so as to form the pyramids in the example described above, the mat-relief may be shaped so as to form vertices and edge lines along smooth curves which permit favorably adjusting degree of blurring of the image due to the diffusion of the light bundle.

In the first embodiment described above, it is preferable to set the diffusing characteristic of the focal plane 8a of the reticle 8 taking into consideration a location of an exit pupil, characteristics such as vignetting of the photographic lens 1, refractive power of the condenser lens 5 or a location of an eye point, etc. For example, it is preferable to set the diffusing characteristic so that the center of a light beam emitted from each point (a portion having an area larger than that occupied by a pyramid on the diffusing surface) on the focal plane 8a of the reticle 8 intersects with the optical axis at a location on the side of the focal plane 8a as compared with the exit pupil of the photographic lens 1 on the optical axis or closest to the optical axis when a light bundle in parallel with the optical axis is allowed to be incident on the reticle 8 through the condenser lens 5 from the side of the eyepiece lens 7, and the center of a light beam emitted from each point (a portion having an area larger than that occupied by a pyramid on the diffusing surface) of the focal plane 8a of the reticle 8 intersects with the optical axis at a location on the side of the eyepiece lens 7 as compared with the pupil of the photographer or closest to the optical axis after passing through the condenser lens 5, pentagonal prism 6 and the eyepiece lens 7 when a light bundle in parallel with the optical axis is allowed to be incident on the reticle 8 from the side of the photographic lens 1. In this case, it is unnecessary to vary the diffused directions of the light beams in conjunction with the distances as measured from the optical axis.

Further, it is possible to impart adequate curvature to the surface of incidence 6a of the pentagonal prism 6 so that a combination of the pentagonal prism 6, the focal plane 8a and the condenser lens 5 has the functions to converge a light bundle and to correct aberrations. Furthermore, the entire surface of the focal plane 8a may be formed as a diffusing surface, or a wedge prism may be disposed at the central portion thereof for focusing by using a split image. Moreover, it is possible to observe a bright and sharp image through the finder optical system by exchanging the reticle 8 with another having different diffusing directions relative to the distances as measured from the optical axis and different balance in refractive power with the condenser lens 5 in conjunction with exchange of an observation unit which is composed of the pentagonal prism and the eyepiece lens 7.

Figure 11:
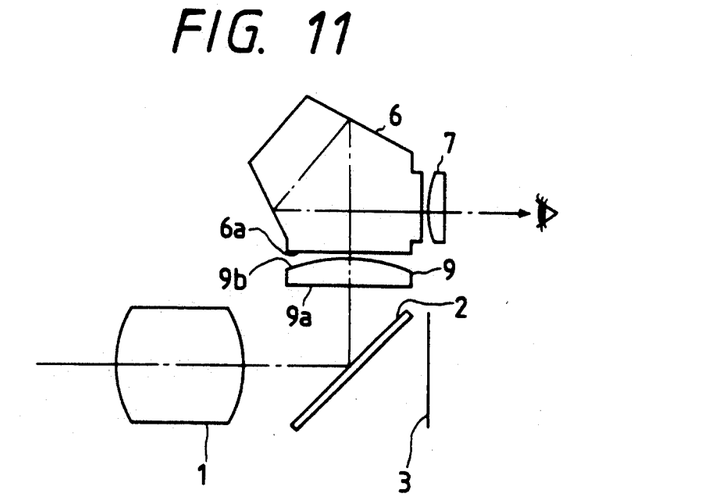
FIG. 11 is a sectional view illustrating an overall configuration of a second embodiment of the finder optical system according to the present invention.
Figure 12:
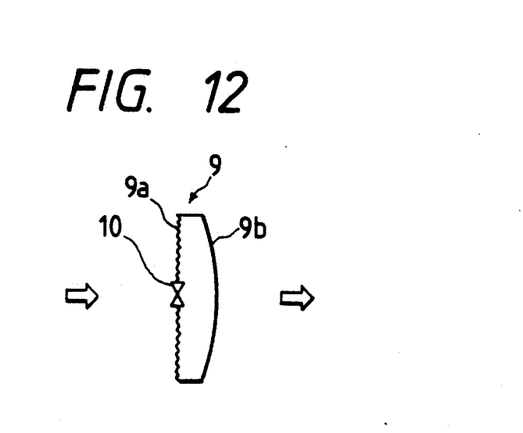
FIG. 12 is a side view illustrating an example wherein a wedge prism is disposed on the reticle in the second embodiment of the present invention.

FIG. 11 and FIG. 12 illustrate a second embodiment of the real image type finder optical system according to the present invention. In the second embodiment, arranged between the quick return mirror 2 and the pentagonal prism 6 is a reticle 9 which has a focal plane 9a on the object side and a condenser lens surface 9b disposed on the side of the eyepiece lens. In this real image type finder optical system, a light bundle which is emitted from the object toward the photographic lens 1 emerges from the photographic lens 1, and then is reflected by the quick return mirror 2 and imaged on the focal plane 9a of the reticle 9. The condenser lens surface 9b of the reticle 9 has the converging function an performs correction of distortion. The pentagonal prism 6 inverts the image formed on the focal plane 9a of the reticle 9 in both the vertical and horizontal directions and the eyepiece lens 7 correct aberrations such as spherical aberration, whereafter the image formed on the focal plane 9a is reimaged on the retina of the photographer.

The second embodiment of the present invention, in which the reticle 9 proper has the focal plane 9a and the condenser lens surface 9b, permits making the structure of the finder optical system compacter as a whole and reducing the number of the members of the finder optical system, thereby lowering manufacturing and assembling cost. Further, the second embodiment makes it possible to obtain a bright and sharp image free from distortion by correcting distortion, spherical aberration and so on.

In the second embodiment described above, the entire area of the focal plane 9a of the reticle 9 may be formed as a diffusing surface, or a wedge prism 10 may be disposed thereon as shown in FIG. 12 for focusing by using a split image. On the other hand, the photographic lens 1 may be of an exchangeable type or a fixed type, and the observation unit which is composed of the pentagonal prism and the eyepiece lens 7 may also be of an exchangeable type or a fixed type. Furthermore, the reticle itself may be of an exchangeable type or a fixed type, and a brighter image can be observed through the finder optical system when the reticle 9 of the exchangeable type and the observation unit are exchanged as a combination. Moreover, it is possible to impart adequate curvature to the surface of incidence 6a of the pentagonal prism 6 so as to perform the functions to condense a light bundle and correct aberrations with a combination of the focal plane 9a of the reticle 9 and the surface of incidence 6a of the pentagonal prism 6.

Figure 13:
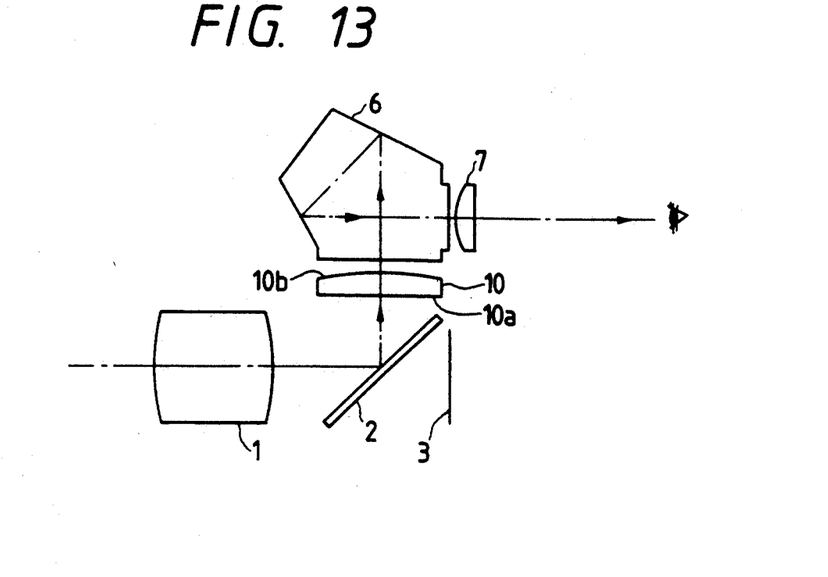
FIG. 13 is a sectional view illustrating an overall configuration of a third embodiment of the finder optical system according to the present invention.
Figure 14:
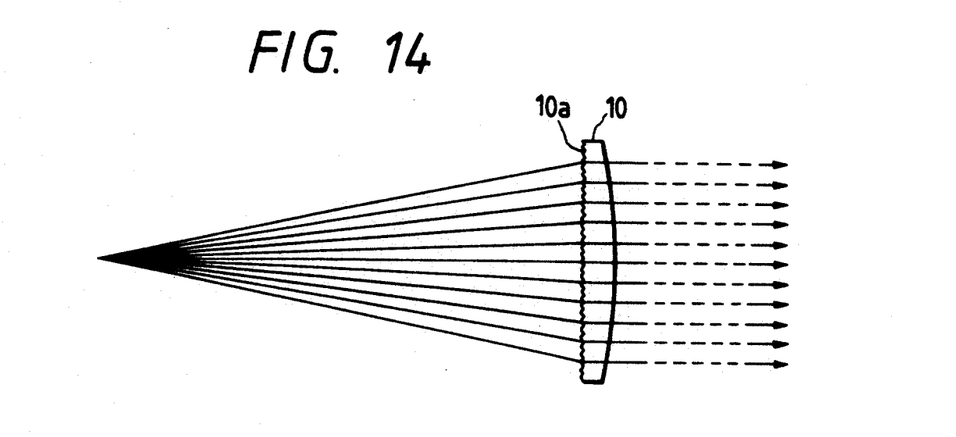
FIG. 14 is a side view illustrating a diffusing characteristic of a reticle used in the third embodiment of the present invention for a light bundle emitted from a point on the optical axis of the reticle.

FIG. 13 illustrates a third embodiment of the real image type finder optical system according to the present invention. The third embodiment has a fundamental configuration which is substantially the same as that of the second embodiment, except for a focal plane 10a of a reticle 10 of the third embodiment which is formed as a diffusing surface and has diffusing directions varying from the central portion toward the marginal portion thereof. The focal plane 10a has a diffusing characteristic exemplified in FIG. 14 wherein a light bundle which is emitted from a point on the optical axis and allowed to be incident on the focal plane 10a is diffused by the reticle 10 so that the center of the light bundle is in parallel with the optical axis.

The third embodiment allows observation of a sharper and brighter image free from distortion to be observed through the finder optical system since the reticle 10 has the diffusing directions varying from the central portion toward the marginal portion of the focal plane 10a in conjunction with variation of image height.

In case of the third embodiment described above, it is possible to obtain a desired condensing characteristic with refractive power of a condenser lens surface 10b of the reticle 10 by imparting curvature required for correcting distortion to the condenser lens surface 10b in addition to the diffusing directions of the focal plane 10a varying in conjunction with the variation of image height. The entire area of the focal plane 10a may be formed as a diffusing surface or a wedge prism may be disposed at the central portion of the focal plane 10a for focusing by using a split image. Further, a brighter and sharper image can be observed through the finder optical system by exchanging the reticle 10 with another which has different diffusing directions and different refractive power of the condenser lens surface 10b in conjunction with exchange of the observation unit which is composed of the pentagonal prism 6 and the eyepiece lens 7.

Figure 15:
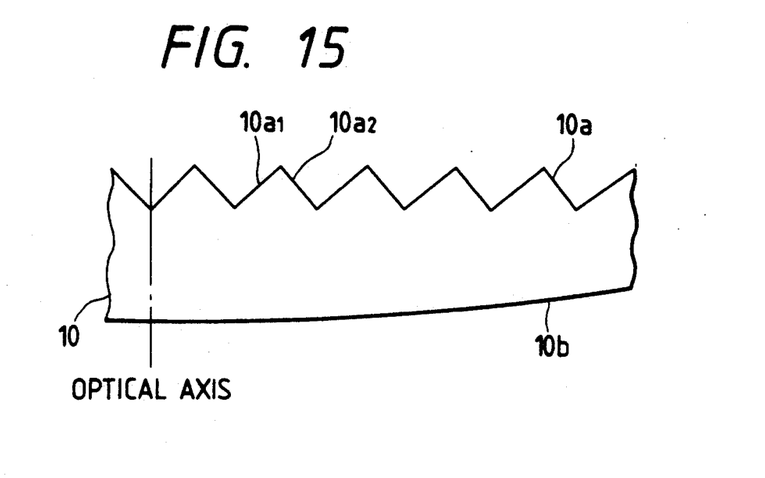
FIG. 15 is a sectional view illustrating a portion of the reticle, on an enlarged scale, used in the third embodiment of the present invention.

In addition, the center of the diffused light bundle can be made parallel with the optical axis by setting the focal plane 10a of the reticle 10 so that inclined surfaces $10a_1$ facing the optical axis have inclination angles relative to the optical axis which are progressively larger as the inclined surfaces are farther from the optical axis.

As is understood from the foregoing description, the present invention provides merits to allow a sharp image to be observed through the finder optical system, enhances accuracy for detecting a focused condition, effectively makes a finder body compacter and obtains a finder optical system which has a bright visual field free from distortion.

What is claimed is:

1. A real image type finder optical system comprising, in order from the object side:
    an objective lens for forming a primary image;
    a reticle having a surface of incidence disposed in the vicinity of said primary image and a diffusing function to diffuse a central beam and a marginal beam of a transmission light bundle in different directions;
    a condenser lens disposed in the vicinity of said reticle and having a refractive power selected so that a total of refractive power of the combination of said reticle and said condenser lens has a converging function; and
    an eyepiece lens for allowing observation of said primary image.

2. A real image type finder optical system comprising, in order from the object side:
    an objective lens for forming a primary image;
    a reticle having a surface of incidence disposed in the vicinity of said primary image, and composed of a diffusing material to diffuse a transmission light bundle in directions varying toward an optical axis from a central portion toward a marginal portions thereof;
    a condenser lens disposed in the vicinity of said reticle and has a refractive power selected so that refractive power of the combination of said reticle and said condenser lens has a converging function; and
    an eyepiece lens for allowing observation of said primary image.

3. A real image type finder optical system comprising, in order from the object side:
    an objective lens for forming a primary image;
    a reticle having a surface of incidence disposed in the vicinity of said primary image and a diffusing function to diffuse a central beam and a marginal beam of a transmission light bundle in different directions;

a condenser lens integrally formed with said reticle and having a refractive power selected so that a total of refractive power of the combination of said reticle and said condenser lens has a converging function; and an eyepiece lens for allowing observation of said primary image.

4. A real image type finder optical system comprising, in order from the object side:

an objective lens for forming a primary image;

a reticle having a surface of incidence disposed in the vicinity of said primary image and composed of a diffusing material to diffuse a transmission light bundle in directions varying toward an optical axis from a central portion toward a marginal portions thereof;

a condenser lens integrally formed with said reticle and having refractive power selected so that a refractive power of the combination of said reticle and said condenser lens has a converging function; and an eyepiece lens for allowing observation of said primary image.

5. A real image type finder optical system according to claim 1 or 3 wherein the surface of said reticle is composed of pyramids disposed continuously and said pyramids are formed so as to have center axes having inclination angles relative to an optical axis progressively larger as said pyramids are farther from the optical axis.

6. A real image type finder optical system according to claim 2 or 4 wherein the surface of incidence of said reticle is composed of pyramids disposed continuously and said pyramids are formed so as to have center axes having inclination angles relative to the optical axis progressively larger as said pyramids are farther from the optical axis.

7. A real image type finder optical system according to claim 1, 2, 3 or 4 wherein said reticle is composed of a holographic optical element having a diffracting function and another holographic optical element having a function of a convex lens.

8. A real image type finder optical system according to claim 1, 2, 3 or 4 wherein the surface of incidence of said reticle has a diffusing surface and said reticle is made of a medium having a distributed index of refraction strengthened in the radial direction as portions of said reticle are farther from the optical axis.

* * * * *